(12) United States Patent
Fontana De Vargas et al.

(10) Patent No.: US 12,517,946 B2
(45) Date of Patent: Jan. 6, 2026

(54) METHOD AND SYSTEM FOR GENERATING CANDIDATE VOCABULARY

(71) Applicant: THE ROYAL INSTITUTION FOR THE ADVANCEMENT OF LEARNING / MCGILL UNIVERSITY, Montreal (CA)

(72) Inventors: Mauricio Fontana De Vargas, Montreal (CA); Karyn Moffat, Montreal (CA)

(73) Assignee: THE ROYAL INSTITUTION FOR THE ADVANCEMENT OF LEARNING / MCGILL UNIVERSITY, Montreal (CA)

( * ) Notice: Subject to any disclaimer, the term of this patent is extended or adjusted under 35 U.S.C. 154(b) by 441 days.

(21) Appl. No.: 18/302,475

(22) Filed: Apr. 18, 2023

(65) Prior Publication Data
US 2023/0334087 A1 Oct. 19, 2023

Related U.S. Application Data

(60) Provisional application No. 63/332,069, filed on Apr. 18, 2022.

(51) Int. Cl.
*G06F 16/538* (2019.01)
*G06F 16/55* (2019.01)
(Continued)

(52) U.S. Cl.
CPC ........... *G06F 16/538* (2019.01); *G06F 16/55* (2019.01); *G06F 40/242* (2020.01); *G06F 40/30* (2020.01)

(58) Field of Classification Search
CPC ...... G06F 16/538; G06F 16/55; G06F 40/242; G06F 40/30
See application file for complete search history.

(56) References Cited

U.S. PATENT DOCUMENTS

| | | | |
|---|---|---|---|
| 6,415,282 B1 * | 7/2002 | Mukherjea | G06F 16/5854 707/913 |
| 8,335,786 B2 * | 12/2012 | Pereira | G06F 16/783 707/747 |

(Continued)

OTHER PUBLICATIONS

Fang, Hao et al. From captions to visual concepts and back. In Proceedings of the IEEE conference on computer vision and pattern recognition, pp. 1473-1482. Jun. 7, 2015. doi: 10.1109/CVPR.2015.7298754.

(Continued)

*Primary Examiner* — Kevin Ky
(74) *Attorney, Agent, or Firm* — Brion Raffoul

(57) ABSTRACT

System and method for generating candidate vocabulary words and presenting them to a user. The system compares an input image to reference images, based on text descriptions of the images, and determines relevant images. Stories associated with the relevant images are then analyzed to determine frequent words in the stories. In one embodiment, the frequent words are presented to the user as candidate words. In another embodiment, a vocabulary database is first accessed to determine other words that are associated with the frequent words in the stories. The frequent words in the stories and the other words from the vocabulary database are then provided to the user as candidate vocabulary words. The user can select desired candidate words through their computing device. In some embodiments, the stories are clustered together before word frequency is analyzed.

17 Claims, 9 Drawing Sheets

(51) Int. Cl.
  *G06F 40/242*  (2020.01)
  *G06F 40/30*   (2020.01)

(56) References Cited

U.S. PATENT DOCUMENTS

| | | | | |
|---|---|---|---|---|
| 11,294,971 | B1* | 4/2022 | Gokhan | G06F 16/951 |
| 2013/0159292 | A1* | 6/2013 | Larlus | G06F 16/40 |
| | | | | 707/E17.084 |
| 2014/0003684 | A1* | 1/2014 | Ayed | G06T 7/11 |
| | | | | 382/128 |
| 2014/0378810 | A1* | 12/2014 | Davis | G06F 16/248 |
| | | | | 600/407 |
| 2015/0161172 | A1* | 6/2015 | Bengio | G06V 20/35 |
| | | | | 707/749 |
| 2018/0075282 | A1* | 3/2018 | Chen | G06T 7/74 |
| 2020/0042837 | A1* | 2/2020 | Skinner | H04L 63/102 |
| 2020/0104588 | A1* | 4/2020 | Annunziata | G06F 18/214 |
| 2023/0334087 | A1* | 10/2023 | Fontana De Vargas | |
| | | | | G06F 40/242 |
| 2025/0225204 | A1* | 7/2025 | Saraee | G06F 18/214 |

OTHER PUBLICATIONS

Huang, Ting-Hao (Kenneth) et al. Visual storytelling. In Proceedings of the 2016 Conference of the North American Chapter of the Association for Computational Linguistics: Human Language Technologies, pp. 1233-1239. Jun. 2016. doi: 10.18653/v1/N16-1147.

Sidorov, Grigori, Alexander Gelbukh, Helena Gomez-Adorno, and David Pinto. Soft similarity and soft cosine measure: Similarity of features in vector space model. Computación y Sistemas, 18(3):491-504. Sep. 2014. doi: 10.13053/cys-18-3-2043.

Charlet, Delphine and Geraldine Damnati. Simbow at semeval—2017 task 3: Soft-cosine semantic similarity between questions for community question answering. In Proceedings of the 11th International Workshop on Semantic Evaluation (SemEval—2017), pp. 315-319. Aug. 2017. doi: 10.18653/v1/S17-2051.

Frey, Brendan J and Delbert Dueck. Clustering by passing messages between data points. Science, 315(5814):972-976. Jan. 11, 2007. doi: 10.1126/science.1136800.

De Deyne, Simon, Danielle J Navarro, Amy Perfors, Marc Brysbaert, and Gert Storms. The "small world of words": English word association norms for over 12,000 cue words. Behavior research methods, 51(3):987-1006. Oct. 8, 2018. 10.3758/s13428-018-1115-7.

Beukelman, David R., Karen Hux, Aimee Dietz, Miechelle McKelvey & Kristy Weissling. Using Visual Scene Displays as Communication Support Options for People with Chronic, Severe Aphasia: A Summary of AAC Research and Future Research Directions, Augmentative and Alternative Communication, 31:3, 234-245. Jun. 5, 2015. doi: 10.3109/07434618.2015.1052152.

Fontana De Vargas, Mauricio and Karyn Moffat. 2021. Automated generation of storytelling vocabulary from photographs for use in AAC. In Proceedings of the 59th Annual Meeting of the Association for Computational Linguistics and the 11th International Joint Conference on Natural Language Processing, pp. 1353-1364. Jan. 2021. doi: 10.18653/v1/2021.acl-long.108.

Bailey, Rita L, Howard P Parette Jr, Julia B Stoner, Maureen E Angell, and Kathleen Carroll. Family members' perceptions of augmentative and alternative communication device use. Language, Speech, and Hearing Services in Schools, 37(1). Jan. 1, 2006. doi: 10.1044/0161-1461(2006/006).

Black, Rolf, Joseph Reddington, Ehud Reiter, Nava Tintarev, and Annalu Waller. Using NLG and sensors to support personal narrative for children with complex communication needs. In Proceedings of the NAACL HLT 2010 Workshop on Speech and Language Processing for Assistive Technologies, pp. 1-9. Jun. 2010. doi: 10.5555/1867750.1867751.

Brock, Kris, Rajinder Koul, Melinda Corwin, and Ralf Schlosser. 2017. A comparison of visual scene and grid displays for people with chronic aphasia: A pilot study to improve communication using aac. Aphasiology, 31(11):1282-1306. Jan. 5, 2017. doi: 10.1080/02687038.2016.1274874.

Copestake, Ann. Augmented and alternative NLP techniques for augmentative and alternative communication. In Natural Language Processing for Communication Aids, pp. 37-42. 1997.

Davies, Mark. The 385+ million word corpus of contemporary american english (1990-2008+): Design, Architecture, and linguistic insights. International journal of corpus linguistics, 14(2):159-190. Jan. 2009. doi: 10.1075/jcl.14.2.02dav.

De Deyne, Simon, Steven Verheyen, Amy Perfors, and Daniel J Navarro. Evidence for widespread thematic structure in the mental lexicon. In Proceedings of the 37th Annual Conference of the Cognitive Science Society, pp. 518-523. Jan. 2015.

Demasco, Patrick W and Kathleen F McCoy. Generating text from compressed input: An intelligent interface for people with severe motor impairments. Communications of the ACM, 35(5):68-78. May 1992. doi: 10.1145/129875.129881.

Demmans Epp, Carrie, Justin Djordjevic, Shimu Wu, Karyn Moffatt, and Ronald M Baecker. Towards providing just-in-time vocabulary support for assistive and augmentative communication. In Proceedings of the 2012 ACM international conference on Intelligent User Interfaces, pp. 33-36. Feb. 2012. doi: 10.1145/2166966.2166973.

Dempster, Martin, Norman Alm, and Ehud Reiter. Automatic generation of conversational utterances and narrative for augmentative and alternative communication: A prototype system. In Proceedings of the NAACL HLT 2010 Workshop on Speech and Language Processing for Assistive Technologies, pp. 10-18. Jun. 2010.

Dietz, Aimee, Miechelle McKelvey, and David R Beukelman. Visual scene displays (VSD): New AAC interfaces for persons with aphasia. Perspectives on Augmentative and Alternative Communication, 15(1):13-17. Apr. 1, 2006.

Drager, Kathryn DR et al. AAC technologies with visual scene displays and "just in time" programming and symbolic communication turns expressed by students with severe disability. Journal of intellectual & developmental disability, 44(3):321-336. Jun. 19, 2017. doi: 10.3109/13668250.2017.1326585.

Fazly, Afsaneh and Graeme Hirst. Testing the efficacy of part-of-speech information in word completion. In Proceedings of the 2003 EACL Workshop on Language Modeling for Text Entry Methods. 2003.

Garay-Vitoria, Nestor and Julio Abascal. 2006. Text prediction systems: A survey. Universal Access in the Information Society, 4(3):188-203. Mar. 2006. doi: 10.1007/s10209-005-0005-9.

Garcia, Luís Filipe, Luís Caldas De Oliveira, and David Martins De Matos. Measuring the performance of a location-aware text prediction system. ACM Transactions on Accessible Computing (TACCESS), 7(1):1-29. Jun. 2015. doi: 10.1145/2739998.

Garrett, Kathryn L. 2005. Adults with severe aphasia. In David R Beukelman and Pat Mirenda, editors, Augmentative and alternative communication for children and adults with complex communication needs, pp. 467-504. Paul H. Brookes, Baltimore.

He, He, Anusha Balakrishnan, Mihail Eric, and Percy Liang. Learning symmetric collaborative dialogue agents with dynamic knowledge graph embeddings. arXiv preprint arXiv:1704.07130. 18 pages. Apr. 24, 2017.

Higginbotham, D Jeffery, Gregory W Lesher, Bryan J Moulton, and Brian Roark. The application of natural language processing to augmentative and alternative communication. Assistive Technology, 24(1):14-24. 2012. doi: 10.1080/10400435.2011.648714.

Hsu, Chao-Chun, Zi-Yuan Chen, Chi-Yang Hsu, Chih-Chia Li, Tzu-Yuan Lin, Ting-Hao Huang, and Lun-Wei Ku. Knowledge-enriched visual storytelling. In Proceedings of the AAAI Conference on Artificial Intelligence, vol. 34, pp. 7952-7960. Apr. 3, 2020. doi: 10.1609/aaai.v34i05.6303.

Mckelvey, Miechelle L, Karen Hux, Aimee Dietz, and David R Beukelman. Impact of personal relevance and contextualization on word-picture matching by people with aphasia. American Journal of Speech-Language Pathology. Feb. 2010. DOI: 10.1044/1058-0360(2009/08-0021).

(56) References Cited

OTHER PUBLICATIONS

Krippendorff, Klaus. Reliability in content analysis: Some common misconceptions and recommendations. Human communication research, 30(3):411-433. Jul. 2004. doi: 10.1111/j.1468-2958.2004.tb00738.x.

Kristensson, Per Ola, James Lilley, Rolf Black, and Annalu Waller. 2020. A design engineering approach for quantitatively exploring context-aware sentence retrieval for nonspeaking individuals with motor disabilities. In Proceedings of the 2020 CHI Conference on Human Factors in Computing Systems, pp. 1-11. Apr. 23, 2020. doi: 10.1145/3313831.3376525.

Lesher, Gregory W and Gerard J Rinkus. Domain-specific word prediction for augmentative communication. In Proceedings of the RESNA 2002 Annual Conference. 2002.

Mccoy, Kathleen F, Christopher A Pennington, and Arlene Luberoff Badman. 1998. Compansion: From research prototype to practical integration. Natural Language Engineering, 4(1):73-95. Apr. 1997. doi: 10.1017/S1351324998001843.

Moffatt, Karyn, Golnoosh Pourshahid, and Ronald M Baecker. Augmentative and alternative communication devices for aphasia: The emerging role of "smart" mobile devices. Universal Access in the Information Society, 16(1):115-128. Sep. 28, 2015. doi: 10.1007/s10209-015-0428-x.

Mooney, Aimee, Steven Bedrick, Glory Noethe, Scott Spaulding, and Melanie Fried-Oken. Mobile technology to support lexical retrieval during activity retell in primary progressive aphasia. Aphasiology, 32(6):666-692. Mar. 25, 2018. doi: 10.1080/02687038.2018.1447640.

Nikolova, Sonya, Marilyn Tremaine, and Perry R Cook. Click on bake to get cookies: Guiding wordfinding with semantic associations. In Proceedings of the 12th international ACM SIGACCESS conference on Computers and accessibility, pp. 155-162. Oct. 25, 2010. doi: 10.1145/1878803.1878832.

Reiter, Ehud. An architecture for data-to-text systems. In Proceedings of the Eleventh European Workshop on Natural Language Generation (ENLG 07), pp. 97-104. Jun. 2007.

Renvall, Kati, Lyndsey Nickels, and Bronwyn Davidson. Functionally relevant items in the treatment of aphasia (part ii): Further perspectives and specific tools. Aphasiology, 27(6):651-677. Jun. 14, 2013. doi: 10.1080/02687038.2013.796507.

Van De Sandt-Koenderman, Mieke. 2004. High-tech aac and aphasia: Widening horizons? Aphasiology, 18(3):245-263. Jun. 24, 2010. doi: 10.1080/02687030344000571.

See, Abigail, Peter J Liu, and Christopher D Manning. Get to the point: Summarization with pointer-generator networks. arXiv preprint arXiv:1704.04368. Apr. 25, 2017.

Su, Yu Huan Sun, Brian Sadler, Mudhakar Srivatsa, Izzeddin Gür, Zenghui Yan, and Xifeng Yan. 2016. On generating characteristic-rich question sets for qa evaluation. In Proceedings of the 2016 Conference on Empirical Methods in Natural Language Processing, pp. 562-572. Nov. 2016. doi: 10.18653/v1/D16-1054.

Wisenburn, Bruce and D Jeffery Higginbotham. An AAC application using speaking partner speech recognition to automatically produce contextually relevant utterances: Objective results. Augmentative and alternative communication, 24(2):100-109. Feb. 2008. doi: 10.1080/07434610701740448.

Tintarev, Nava, Ehud Reiter, Rolf Black, and Annalu Waller. Natural language generation for augmentative and assistive technologies. In Natural Language Generation in Interactive Systems, pp. 252-277. Cambridge University Press. Jul. 5, 2014. doi: 10.1017/CBO9780511844492.011.

Tintarev, Nava, Ehud Reiter, Rolf Black, Annalu Waller, and Joe Reddington. Personal storytelling: Using natural language generation for children with complex communication needs, in the wild . . . International Journal of Human-Computer Studies, 92:1-16. Apr. 2016. doi: 10.1016/j.ijhcs.2016.04.005.

Trnka, Keith and Kathleen F McCoy. Evaluating word prediction: Framing keystroke savings. In Proceedings of ACL-08: HLT, Short Papers, pp. 261-264. Jan. 2008.

Trnka, Keith, Debra Yarrington, John McCaw, Kathleen F McCoy, and Christopher Pennington. The effects of word prediction on communication rate for AAC. In Human Language Technologies 2007: The Conference of the North American Chapter of the Association for Computational Linguistics; Companion Volume, Short Papers, pp. 173-176. Apr. 2007.

Trnka, Keith, Debra Yarrington, Kathleen McCoy, and Christopher Pennington. 2006. Topic modeling in fringe word prediction for AAC. In Proceedings of the 11th international conference on Intelligent user interfaces, pp. 276-278. Jan. 2006. doi: 10.1145/1111449.1111509.

Wallace, Sarah E and Karen Hux. Effect of two layouts on high technology AAC navigation and content location by people with aphasia. Disability and Rehabilitation: Assistive Technology, 9(2):173-182. May 21, 2013. doi: 10.3109/17483107.2013.799237.

Waller, Annalu. Telling tales: Unlocking the potential of AAC technologies. International journal of language & communication disorders, 54(2):159-169. Dec. 30, 2018. doi: 10.1111/1460-6984.12449.

Wandmacher, Tonio, Jean-Yves Antoine, Franck Poirier, and Jean-Paul Départe. Sibylle, an assistive communication system adapting to the context and its user. ACM Transactions on Accessible Computing (TACCESS), 1(1):1-30. May 1, 2008. doi: 10.1145/1361203.1361209.

Fontana De Vargas, Mauricio. Design and Evaluation of a Context-Adaptive AAC Application for People with Aphasia. Poster presented at the Doctoral Consortium at the ACM ASSETS 2018. Oct. 22, 2018. 1 page.

Fontana De Vargas, Mauricio. Design and evaluation of a context-adaptive AAC application for people with aphasia. SIG ACCESS. Issue 123, Jan. 2019. 5 pages.

Collins, Allan M. and Elizabeth F. Loftus. A spreading-activation theory of semantic processing. Psychological Review 82, 6: 407-428. 1975. doi: 10.1037/0033-295X.82.6.407.

De Deyne, Simon and Gert Storms. Word associations: Network and semantic properties. Behavior Research Methods 40, 1: 213-231. Feb. 2008. doi: 10.3758/BRM.40.1.213.

Demmans Epp, Carrie, Rachelle Campigotto, Alexander Levy, and Ron Baecker. MarcoPolo: context-sensitive mobile communication support. Proc. FICCDAT: RESNA/ICTA. 4 pages. Jan. 2011.

Kane, Shaun K, Barbara Linam-Church, Kyle Althoff, and Denise McCall. What we talk about: designing a context-aware communication tool for people with aphasia. In Proceedings of the 14th international ACM SIGACCESS conference on Computers and accessibility, 49-56. Oct. 22, 2012. doi: 10.1145/2384916.2384926.

Park, DongGyu G., Sejun Song, and DoHoon H. Lee. Smart phone-based context-aware augmentative and alternative communications system. Journal of Central South University 21, 9: 3551-3558. Dec. 6, 2014. doi: 10.1007/s11771-014-2335-3.

Patel, Rupal and Rajiv Radhakrishnan. Enhancing Access to Situational Vocabulary by Leveraging Geographic Context. Assistive Technology Outcomes and Benefits 4, 1: 99-114. 2007.

Dominowska, Ewa. A Communication Aid with Context-Aware Vocabulary Prediction. Massachusetts Institute of Technology. 136 pages.

Speer, Robert, Joshua Chin, and Catherine Havasi. ConceptNet 5.5: An Open Multilingual Graph of General Knowledge. Singh 2002. arXiv 1612.03975. Dec. 11, 2018.

Wanzare, Lilian D A, Alessandra Zarcone, Stefan Thater, and Manfred Pinkal. 2016. DeScript: A Crowdsourced Corpus for the Acquisition of High-Quality Script Knowledge. Proceedings of the Tenth International Conference on Language Resources and Evaluation (LREC 2016): 3494-3501. May 2016.

\* cited by examiner

METHOD AND SYSTEM FOR GENERATING CANDIDATE VOCABULARY

RELATED APPLICATIONS

This application claims the benefit of priority from U.S. Provisional Application No. 63/332,069, filed on Apr. 18, 2022.

TECHNICAL FIELD

The present invention relates to Augmentative and Alternative Communication (AAC). More specifically, the present invention relates to generating candidate vocabulary words for a user.

BACKGROUND

Augmentative and Alternative Communication (AAC) tools can enhance communication for non-speaking individuals, thus offering improved social interaction and independence. Well-established natural language processing (NLP) techniques, such as spell check and word prediction, support individuals with primarily physical barriers to communication (e.g., adults with ALS), allowing them to compose complex and nuanced sentences more efficiently in orthographic-based systems.

However, such tools are not always helpful for other individuals, such as those with developmental disabilities such as autism spectrum disorder (ASD) and/or lexical and semantic processing impairments such as aphasia. Individuals with such disorders must usually rely on less expressive, symbol-based systems, for which conventional NLP techniques offer little support. Users of symbol-based AAC typically do not construct full, grammatically correct sentences, complete with prepositions and inflections. Rather, they often only need a few key content words ("core words", i.e., nouns, adjectives, verbs) to supplement other forms of communication. Such scattered use of vocabulary hinders the typical statistical prediction approach of NLP-based tools, which rely on patterns learnt from a large training corpus of documents that generally use grammatically complete sentences.

Conventional tools for users of symbol-based communication systems include "word boards", i.e., physical boards and/or papers with a variety of common terms printed thereon. Of course, such physical word boards are limited by their physical size and often do not include the actually desired word. Other conventional tools include mobile word board applications, such as Proloquo2Go™, which provides a much larger variety of words than a typical physical word board. Additionally, some such apps also "read aloud" (i.e., play recordings of) the words the user selects in real time, so that the user can converse with others. However, such apps are still often difficult to navigate, especially when a user desires a 'non-core' word (i.e., words that are less commonly used in everyday speech). Using non-core words with such an application may require substantial customization of the app interface, either by the user or a caregiver, which is often tedious and impractical. Further, it is difficult to know in advance what non-core words will be desired in any scenario, making such customization often unhelpful.

As such, there is a need for systems and methods that provide targeted candidate vocabulary words in response to a real-time scenario (i.e., 'just-in-time' candidate words for the user to choose from). Additionally, such candidate vocabulary words preferably include words that describe both tangible and intangible concepts, entities, sensations, emotions, etc.

SUMMARY

This document discloses a system and method for generating candidate vocabulary words and presenting them to a user. The system compares an input image to reference images, based on text descriptions of the images, and determines relevant images. (A 'relevant image' has a description similar to the description of the input image.) Stories (i.e., a set of narrative sentences, described further below) associated with the relevant images are then analyzed to determine frequent words in the stories. In one embodiment, the frequent words are presented to the user as candidate words. In another embodiment, a vocabulary database is first accessed to determine other words that are associated with the frequent words in the stories. The frequent words in the stories and the associated words from the vocabulary database are then provided to the user as the candidate vocabulary words. The user can select desired candidate words through their computing device.

In a first aspect, this document discloses a method for providing candidate words to a user, the method comprising: receiving an input image from a computing device used by said user; generating, at a server, a description for said input image; comparing said description to reference descriptions in a reference database, wherein: each of said reference descriptions is associated with a reference image in said reference database, said comparing produces a plurality of similarity scores between said reference descriptions and said description, wherein a specific one of said similarity scores is an indication of a semantic similarity between a specific one of said reference descriptions and said description, and when said specific one of said similarity scores is above a predetermined similarity threshold, a specific reference image corresponding to said specific one of said reference descriptions is determined to be a relevant image, to thereby result in a plurality of relevant images; retrieving, for each relevant image from said plurality of relevant images, at least one story associated with said relevant image, to thereby retrieve a plurality of stories; analyzing said plurality of stories to determine frequency scores for a plurality of words derived from said plurality of stories, wherein each of said frequency scores is an indication of a frequency of appearance of each of said plurality of words; when said frequency score for a specific word in said plurality of words is above a predetermined frequency threshold, adding said specific word to a pool of frequent words, such that words in said pool of frequent words comprise said candidate words; and providing said candidate words to said computing device for presentation to said user.

In another embodiment, this document discloses a method further comprising retrieving associated vocabulary words from a vocabulary database before providing said candidate words to said user, wherein said vocabulary database also contains words in said pool of frequent words, wherein each of said associated vocabulary words is linked, in said database, to at least one of said words in said pool of frequent words, wherein each pair of words in said vocabulary database is linked together based on semantic relatedness between said pair of words, said semantic relatedness being based on at least one of: a similarity of meaning of said pair of words; a frequency of co-occurrence in written text of said pair of words; and responses of human participants in word-association experiments, and wherein said candidate words comprise said words in said pool of frequent words and said associated vocabulary words.

In another embodiment, this document discloses a method wherein said description of said input image is generated using machine learning.

In another embodiment, this document discloses a method wherein said analyzing said plurality of stories further comprises clustering said plurality of stories to thereby create a plurality of clusters, such that all stories in each cluster are semantically similar and wherein each cluster has an exemplar, said exemplar being a story that represents the cluster, such that a plurality of exemplars is generated, and wherein said frequency scores are only determined for words derived from said plurality of exemplars.

In another embodiment, this document discloses a method wherein a number of candidate vocabulary words is limited by said user.

In another embodiment, this document discloses a method wherein said similarity score is a numerical value between zero and one.

In another embodiment, this document discloses a method wherein said frequency score is a numerical value between zero and one.

In a second aspect, this document discloses a system for providing candidate words to a user, the system comprising: a reference database containing reference descriptions and stories, wherein each of said reference descriptions and each of said stories is associated with a reference image; and a server for receiving an input image submitted by said user using a computing device, the server further comprising: a description-generation module for automatically generating a description for said input image; a similarity-analysis module for automatically comparing said description to reference descriptions in said reference database to thereby generate a plurality of similarity scores between said reference descriptions and said description, wherein a specific one of said similarity scores is an indication of a semantic similarity between a specific one of said reference descriptions and said description, such that, when a specific one of said similarity scores is above a predetermined similarity threshold, a specific reference image corresponding to said specific one of said reference descriptions is determined to be a relevant image; and a frequency-analysis module for analyzing a plurality of stories to determine frequency scores for a plurality of words derived from said plurality of stories, wherein, when said frequency score of a specific one of said plurality of words is above a predetermined frequency threshold, said specific word is added to a pool of frequent words; and wherein each of said plurality of stories is associated with a relevant image, wherein said words in said pool of frequent words comprise said candidate words, and wherein said server provides said candidate words to said computing device for presentation to said user.

In another embodiment, this document discloses a system further comprising: a vocabulary database containing a plurality of words, wherein each of said plurality of words is linked to at least one other of said plurality of words and wherein said plurality of words comprises words in said pool of frequent words; and a vocabulary expansion module for receiving said pool of frequent words from said frequency-analysis module and for retrieving associated words from said vocabulary database, said associated words being linked to words in said pool of frequent words, wherein said frequent words and said associated words together comprise said candidate words.

In another embodiment, this document discloses a system wherein said description-generation module generates said description of said input image using machine learning.

In another embodiment, this document discloses a system wherein, before determining said frequency scores, said frequency-analysis module clusters said plurality of stories to thereby create a plurality of clusters, such that all stories in each cluster are semantically similar and wherein each cluster has an exemplar, said exemplar being a story that represents the cluster, such that a plurality of exemplars is generated, and wherein said frequency scores are only determined for words derived from said plurality of exemplars.

In another embodiment, this document discloses a system wherein a number of candidate vocabulary words is limited by said user.

In another embodiment, this document discloses a system wherein each pair of words in said vocabulary database are linked together based on at least one of: a similarity of meaning of said pair of words; a frequency of co-occurrence in written text of said pair of words; and responses of human participants in word-association experiments.

In another embodiment, this document discloses a system wherein said similarity score is a numerical value between zero and one.

In another embodiment, this document discloses a system wherein said frequency score is a numerical value between zero and one.

In a third aspect, this document discloses non-transitory computer-readable media having encoded thereon computer-readable and computer-executable instructions, that, when executed, implement a method for providing candidate words to a user, the method comprising: receiving an input image from a computing device used by said user; generating, at a server, a description for said input image; comparing said description to reference descriptions in a reference database, wherein: each of said reference descriptions is associated with a reference image in said reference database, said comparing produces a plurality of similarity scores between said reference descriptions and said description, wherein a specific one of said similarity scores is an indication of a semantic similarity between a specific one of said reference descriptions and said description, and when said specific one of said similarity scores is above a predetermined similarity threshold, a specific reference image corresponding to said specific one of said reference descriptions is determined to be a relevant image, to thereby result in a plurality of relevant images; retrieving, for each relevant image from said plurality of relevant images, at least one story associated with said relevant image, to thereby retrieve a plurality of stories; analyzing said plurality of stories to determine frequency scores for a plurality of words derived from said plurality of stories, wherein each of said frequency scores is an indication of a frequency of appearance of each of said plurality of words; when said frequency score for a specific word in said plurality of words is above a predetermined frequency threshold, adding said specific word to a pool of frequent words, such that words in said pool of frequent words comprise said candidate words; and providing said candidate words to said computing device for presentation to said user.

In another embodiment, this document discloses computer-readable media wherein said method further comprises retrieving associated vocabulary words from a vocabulary database before providing said candidate words to said user, wherein said vocabulary database also contains words in said pool of frequent words, wherein each of said associated vocabulary words is linked, in said database, to at least one of said words in said pool of frequent words, wherein each pair of words in said vocabulary database is linked together based on semantic relatedness between said pair of words, said semantic relatedness being based on at least one of: a similarity of meaning of said pair of words; a frequency of co-occurrence in written text of said pair of words; and responses of human participants in word-association experiments, and wherein said candidate words comprise said words in said pool of frequent words and said associated vocabulary words.

In another aspect, this document discloses a method for providing candidate words to a user, the method comprising: receiving an input image from a computing device used by said user; generating, at a server, a description for said input image; comparing said description to reference descriptions in a reference database to determine relevant images, wherein each of said reference descriptions is associated with a reference image in said reference database, and wherein said relevant images are associated with reference descriptions that are similar to said description; retrieving, for each relevant image, at least one story associated with said relevant image, to thereby retrieve a plurality of stories; analyzing said plurality of stories to determine a pool of frequent words, such that words in said pool of frequent words comprise said candidate words; and providing said candidate words to said computing device for presentation to said user.

BRIEF DESCRIPTION OF THE DRAWINGS

The present invention will now be described by reference to the following figures, in which identical reference numerals refer to identical elements and in which.

DETAILED DESCRIPTION

To better understand the present invention, the reader is directed to the listing of citations at the end of this description. For ease of reference, these citations and references have been referred to by their listing number throughout this document. The contents of the citations in the list at the end of this description are hereby incorporated by reference herein in their entirety.

The present invention provides a system for generating candidate vocabulary words and presenting them to a user. The system compares an input image to reference images, based on text descriptions of the images, and determines relevant images. Stories associated with the relevant images are then analyzed to determine frequent words in the stories. A vocabulary database is then accessed to determine other words that are associated with the frequent words in the stories. The frequent words in the stories and the other words determined from the vocabulary database are then provided to the user as candidate vocabulary words.

Figure 1A:
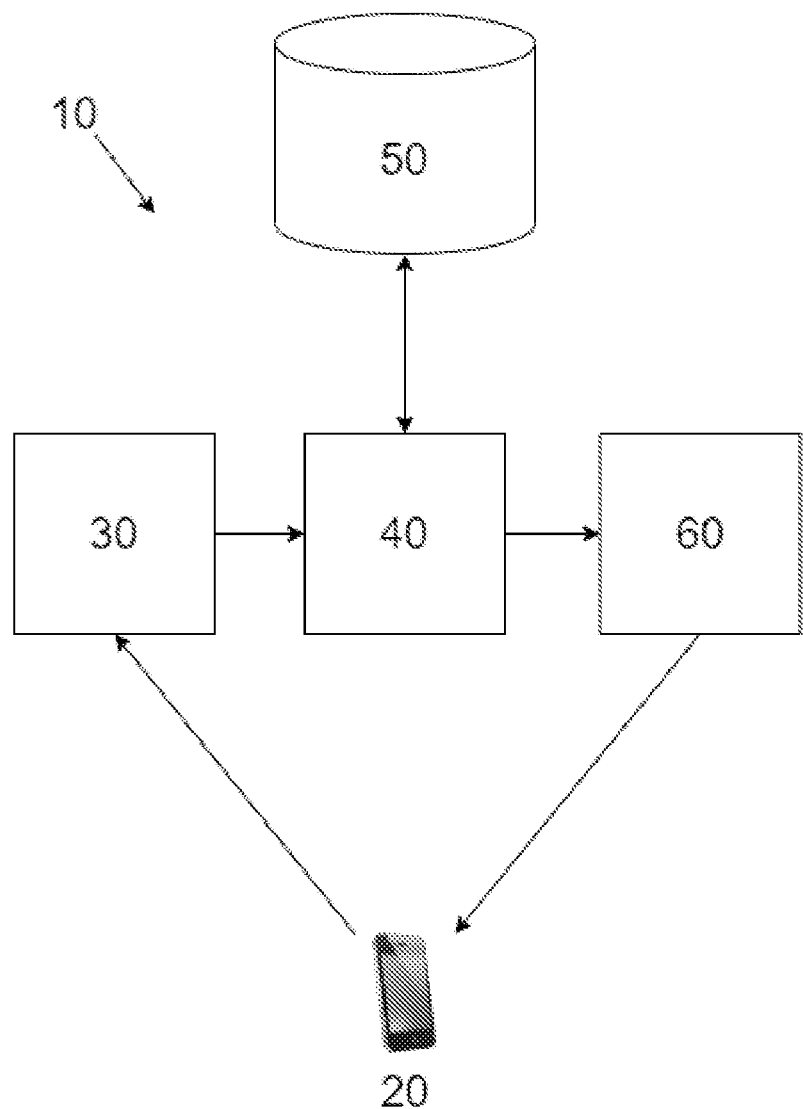
FIG. 1A is a block diagram illustrating a system according to one aspect of the invention.

FIG. 1A illustrates a system 10 in accordance with one embodiment of the invention. The user uploads an input image to a server using a computing device 20. The input image is passed to a description-generation module 30 that generates a description of the scenario depicted in the image. The description is passed to a similarity-analysis module 40, which compares the description to descriptions of other images in the reference database 50. The reference database 50 comprises a plurality of reference descriptions, each of which is associated with a specific reference image, and a plurality of stories. Each story is also associated with a reference image, such that each reference image has an associated reference description and at least one associated story.

The similarity-analysis module 40 computes a similarity score between the description of the input image and each of the reference descriptions in the reference database 50. As such, the input image will have a plurality of similarity scores, each specific one of the similarity scores being an indication of how similar the description of the input image is to a corresponding specific reference description in the reference database 50. In one embodiment, the similarity score is a number between zero and one, where zero is 'no similarity' and one is 'exact match'/'perfect similarity'. If the similarity score for a specific reference description is above a predetermined similarity threshold, the reference image associated with that specific reference description is determined to be a 'relevant image'. A plurality of reference images, each having similarity scores above the similarity threshold, thereby comprises a set of relevant images. As will be further discussed below, the size of the set depends on the desired implementation of the invention.

Once a set of relevant images is identified, the similarity-analysis module 40 retrieves at least one story associated with each reference image in the set of relevant images. The stories are retrieved from the reference database 50. In one embodiment, where a relevant image has more than one associated story, all stories available for that image are retrieved. Further, of course, in some embodiments, a maximum number of stories to be retrieved may be set (e.g., a maximum of three stories per image, etc.). For example, in one embodiment, only one story for a relevant image is retrieved, regardless of the number of stories associated with that relevant image. The person skilled in the art would be able to determine a preferred number of stories to retrieve for any implementation. Note, however, that as more stories are analyzed, the likelihood of encountering additional words increases.

The retrieved stories are passed to a frequency-analysis module 60 which analyses the frequency of words within the stories. Frequency analysis can be performed according to various methods (e.g., using clustering methods), as described more below. However, in general, the frequency-analysis module 60 determines a frequency score for each word in the plurality of stories. As would be understood, the frequency score is an indication of the frequency of each word in the group of retrieved stories. In one embodiment, the frequency scores are normalized such that the frequently appearing word(s) has/have a frequency score of one and the least frequently appearing word(s) has/have a frequency score of zero.

When the frequency score of a word is above a predetermined frequency threshold, the word is added to a pool of 'frequent words'. In one embodiment, the pool of frequent words comprises the candidate vocabulary words. In this embodiment, the words in the pool of frequent words are presented to the user through the user's device 20, as described further below.

Figure 1B:
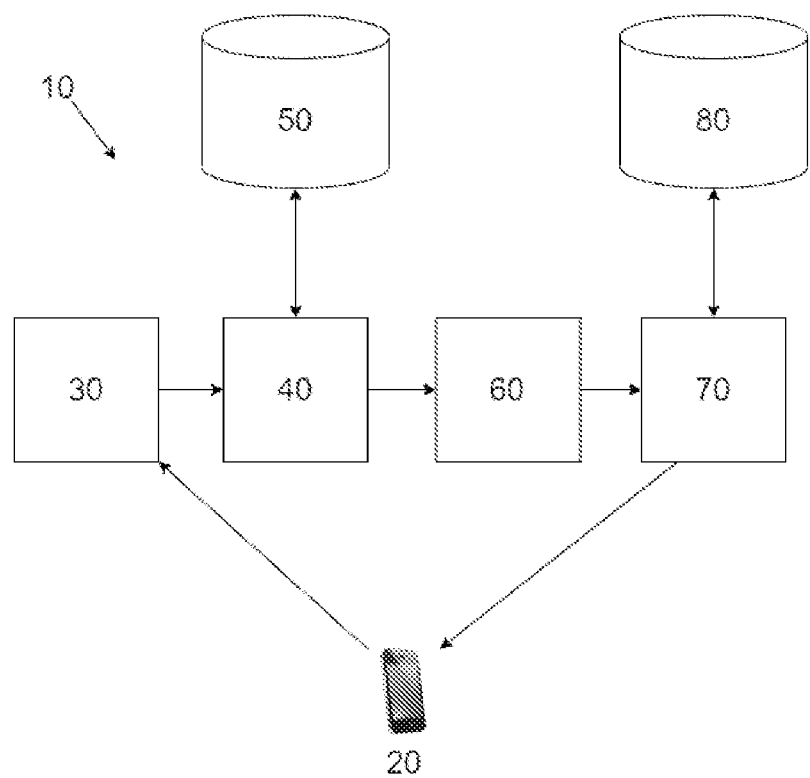
FIG. 1B is a block diagram illustrating a system according to another embodiment of the invention.

In another embodiment, shown in FIG. 1B, the pool of frequent words is first passed to a vocabulary-expansion module 70, which accesses a vocabulary database 80. The vocabulary database 80 contains a plurality of words, each of which is linked to at least one other word in the vocabulary database 80. Pairs of words in the vocabulary database 80 are linked together based on a level of semantic relatedness of the words in the pair—i.e., based on a similarity of meaning, on a frequency of co-occurrence in written text, and/or on semantic associations. In a preferred embodiment, the linkages within the vocabulary database 80 are determined based on the responses of human participants in word-association experiments. For each word in the pool of frequent words, in some embodiments, the vocabulary-expansion module 70 retrieves a predetermined number of associated words from the vocabulary database 80. In other embodiments, all available associated words for each word in the pool of frequent words are retrieved. In general, with a suitably large vocabulary database 80, all of the frequent words in the pool of frequent words should be present in the vocabulary database 80. However, should one of the frequent words not be found in the vocabulary database, words associated with that word would not be retrieved.

Figure 2:
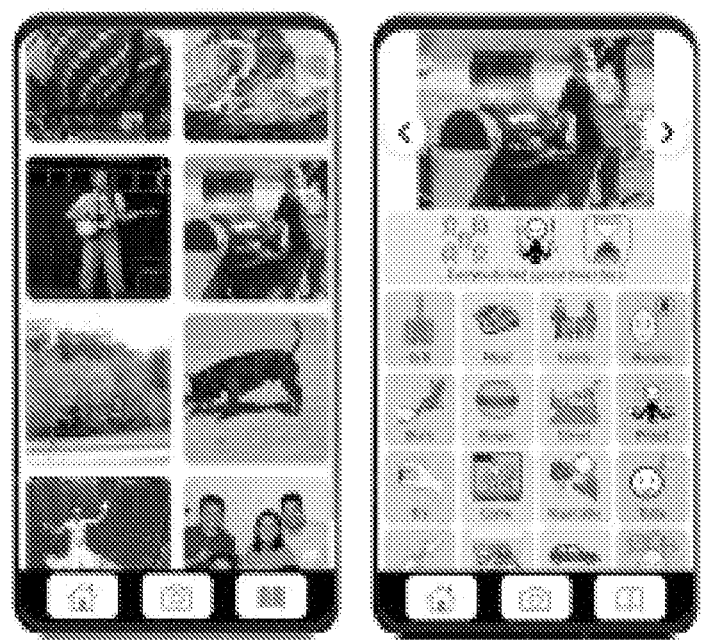
FIG. 2 shows an exemplary user interface for displaying candidate vocabulary words generated according to an aspect of the invention.

In this embodiment, the retrieved associated words and the words in the pool of frequent words together comprise the candidate vocabulary words. The candidate vocabulary words are passed to the user's computing device 20 and presented to the user for selection of one or more words. A purpose-built application on the user's computing device preferably presents the candidate vocabulary words to the user through a graphical user interface (GUI) designed to facilitate word selection. For example, each of the candidate vocabulary words may be associated with an icon, image, or other small graphic representing that word. An exemplary user interface for such an application is shown in FIG. 2.

As would be understood, the description-generation module 30, similarity-analysis module 40, frequency-analysis module 60, and vocabulary-expansion module 70 are all embodied on a server. In some embodiments, the server comprises a single physical server, while in other embodiments, the server comprises multiple physically remote server units (i.e., a cloud-based server). Further, in some embodiments, the description-generation module 30, similarity-analysis module 40, frequency-analysis module 60, and vocabulary-expansion module 70 are all separate modules, while, in other embodiments, functions of more than one module as described above are performed by a single module.

The number of candidate vocabulary words presented to the user is preferably limited for ease of display. For example, in one embodiment, the number of candidate vocabulary words presented to the user is limited to 20. In another embodiment, the number of candidate vocabulary words is limited by limiting the number of frequent words and/or the number of associated words retrieved from the vocabulary database 80. For example, in some embodiments, a predetermined parameter is set such that no more than three associated words are retrieved for each word in the pool of frequent words. Associated words for display to the user can be selected based on a strength of association, an order of retrieval, or any other suitable parameter.

The input image, in some embodiments, is a photograph taken by the user that depicts a real-world scenario. In other embodiments, the input image is an image of a scenario where the user was not present (i.e., a photograph taken by someone other than the user). In still other embodiments, the input image depicts a fantasy scenario and/or is not a photograph (e.g., the input image is a drawing, a computer-generated image, etc.).

As would be understood, in one embodiment, the user's computing device 20 is a mobile computing device integrated with a camera, such as a smartphone or a tablet integrated with at least one camera. In other embodiments, the computing device 20 may be another kind of computing device, such as a laptop or desktop computer, a wearable device, or any other device suitable for uploading images and/or receiving candidate words. Further, in some embodiments, the computing device 20 that receives the generated candidate vocabulary words is the same computing device 20 that uploaded the input image. However, in other embodiments, the computing device 20 may comprise separate computing devices. As a non-limiting example, a user may upload an input image using a mobile smartphone and receive the generated candidate words on a laptop computer. Such configurations are preferably user-selectable.

The description-generation module 30 preferably uses a computer-vision-based captioning approach to generate a description for the input image. In one exemplary embodiment of the invention, the captioning technique used is the captioning technique described in [1]. "Captioning" as used herein means providing a description that not only describes features depicted in the image but also describes the interrelations of the features and/or context or surrounding of the identified features (i.e., a description that describes the depicted scenario, potentially including abstract or intangible concepts in addition to the tangible features depicted).

Figure 3:
FIG. 3 is an exemplary input image.

The description of the input image is thus a short text passage that preferably describes the depicted features, any actions being performed and the interactions between the objects, people, and environment that are depicted. As an example, if the image shown in FIG. 3 were passed to the system 10 as an input image, a possible description would be "a man sitting at a table with a birthday cake with lit candles". Another possible description would be "a man preparing to blow out candles on a birthday cake". As should be understood, the specific description generated depends on the specific method or model used to generate the description, as well as on the input image itself.

The similarity-analysis module 40 identifies similar descriptions in the reference database 50 by calculating the sentence similarity between the input image description and all reference descriptions in the reference database 50. In one embodiment, the reference database 50 comprises the well-known VIST-TRAIN dataset ([2]), which is a subset of the larger VIST dataset. Presently, VIST-TRAIN comprises 80% of the VIST dataset, and comprises 65,394 images of personal events grouped in 16,168 stories. Each image is annotated with descriptions and narrative phrases that are part of a story. The descriptions, narrative phrases, and stories are created by 1,907 Amazon Mechanical Turk workers.

Sentence similarity calculated by the similarity-analysis module 40 can be defined as the soft cosine similarity (see [3]) on a bag-of-words representation of the description, using Word2Vec embeddings after removing stop words. "Stop words", as is well-known, are common words such as prepositions, articles, etc. that generally provide little semantic value to a text. "Word2Vec embedding", as used herein, is a well-known manner of representing the meaning of words in a computer-understandable way. In Word2Vec embeddings, words are encoded as vectors on a multidimensional space and each vector is represented as a sequence of numbers. By applying conventional linear algebra techniques on these sequences of numbers (e.g., to derive a cosine similarity metric, as described more below), the distance between words in the multidimensional space can be determined. Further, semantic content of the words can be computed through such embeddings. As a non-limiting example, subtracting a vector embedding of the word "Man" from a vector embedding of the word "King" and adding a vector embedding of the word "Woman" would yield a vector embedding of the word "Queen".

Cosine similarity, referenced above, captures the semantic relatedness between different words. Soft cosine similarity with Word2Vec was effective for finding similar sentences on question-answering systems, achieving the best performance at the SemEval-2017 Task 3 ([4]). However, other metrics can be used to determine the similarity between the input image's description and the reference descriptions, depending on the embodiment. Further, similarity metrics and embeddings based on entire documents (e.g., Doc2Vec) could be used in some embodiments, provided that a suitable training corpus existed to train the metric.

The sentence similarity score is compared to a predetermined parameter (Similarity Threshold). When the similarity score for a specific reference description is higher than the Similarity Threshold, the associated reference image is determined to be a 'relevant image'. At least one story associated with each relevant image is then retrieved from the reference database 50. A 'story', as used herein, is generally a short piece of narrative text. Some stories may be only one sentence, phrase, or clause, while other stories may comprise several sentences. Further, although some stories directly relate to and/or describe a scenario depicted in the associated image(s), some stories are not or not purely descriptive. As such, some stories include intangible concepts, emotions, moods, etc., that cannot be depicted in an image (e.g., 'sadness', 'joy', 'peace', etc.).

Once the stories are retrieved, a group of representative sentences and words (i.e., the pool of frequent words) is derived from the retrieved set of stories. In one embodiment, the Affinity Propagation clustering approach of [5] is used to form the basis of this pool. (In one exemplary implementation, the following parameters were used for the Affinity Propagation approach: damping=0.5, maximum iterations=200, convergence iterations=15.) This approach generates clusters of words and phrases with less error than other exemplar-based algorithms and does not requiring a predetermined number of clusters. However, as would be understood, any suitable approach and/or model may be used depending on the embodiment. The pool of frequent words comprises the exemplars of each cluster, ranked according to the respective cluster's size. By definition, this strategy results in stories covering the wide range of semantics present in the set of retrieved stories, while at the same time removing redundant (i.e., exact match or very similar) phrases.

In case of non-convergence using the above clustering approach, all stories are ranked according to the sum of their soft cosine similarity against all other stories retrieved. A predetermined parameter (e.g., "Selection Method") can be used to determine whether frequencies are calculated considering all retrieved stories or only clusters' exemplars.

The pool of frequent words is then formed by determining frequency scores of a plurality of words in the retrieved stories (either in all retrieved stories or exemplars of the clusters, depending on the embodiment). Stop words are filtered out and a porter stemmer is applied to merge different variations of terms (e.g., the terms 'worked' and 'working' would be identified as two instances of the stem term 'work'). The frequency score of a specific word, as mentioned above, indicates how frequently the word appears in the stories/exemplars. Words having a frequency score above a predetermined frequency threshold are then added to the pool of frequent words.

The pool of frequent words is then passed to the vocabulary-expansion module 70, which communicates with the vocabulary database 80. The vocabulary database 80, in some embodiments, is constructed by human input. However, in other embodiments, the vocabulary database 80 is constructed by machine analysis of a corpus of texts. Further, in some embodiments, the vocabulary database 80 is constructed using a combination of human input and machine analysis. In one embodiment, further, the words in the vocabulary database 80 are linked to each other based on a model of the human mental lexicon. Such a model associates words based on human word-associations rather than matching parts of speech/meanings. As an example, in such a model, the word 'cake' could be associated with 'sweet'. Using a database containing such word-association-based connections between words (e.g., based on the "Small World of Words" (SWOW) model, [6]) allows the generation of candidate vocabulary words related to the input image but that are not necessarily depicted in the input image. A predetermined parameter in the model (e.g., Expansion Size) can be used to determine how many words are retrieved from the vocabulary database.

The retrieved associated words and the pool of frequent words can then be transmitted back to the user's computing device 20 as the candidate vocabulary words. As would be understood, the set of candidate vocabulary words generated for any input image is specific to that image and to the contents of the reference database 50 and vocabulary database 80 at the time the candidate vocabulary words are generated. As such, different users uploading similar images at different times may receive different candidate words. As well, note that the system evaluates all reference descriptions in the reference database 50 each time an input image is inputted and generates similarity scores between that input image's description and each individual reference description in the reference database 50. As such, without adding new reference descriptions and/or stories to the reference database 50, inputting an input image for a second time will cause the same candidate words previously retrieved to be retrieved again.

EXAMPLES

Exemplary evaluation experiments were performed, to evaluate how system-controllable parameters, along with uncontrollable factors related to the input photograph (i.e., uncontrollable parameters), affect the system's performance. For AAC usage, the performance of vocabulary generation systems is conceptualized as the combination of two factors: (i) communication flexibility, i.e., whether vocabulary needed for composing messages about a specific experience is provided, and (ii) communication ease, i.e., the difficulty of finding a particular word among all options generated.

These two factors directly map to the information retrieval concepts of precision (P) and recall (R). That is, a perfect vocabulary-generation algorithm would provide all words the user needs to communicate the desired message (R=1), and would not contain any irrelevant vocabulary (P=1), thereby minimizing the need for scanning. In contrast, the worst algorithm would provide only irrelevant vocabulary (P=R=0).

As such, vocabulary generation can be understood as an information retrieval problem, where the input image is treated as the user query, generated words and phrases are treated as retrieved documents, and crowd-sourced narrative sentences about the photograph are the relevant documents, i.e., ground truth. In one experiment, input photographs and ground-truth stories and descriptions were taken from VIST-VAL, a subset of VIST that contains 8034 photos aligned with crowd sourced stories (i.e., VIST-VAL was the reference database 50). 1,946 images from VIST-VAL, each associated with five stories, comprised the reference images. The ground-truth vocabulary for each photograph was formed by joining each set of five associated stories, after removing stop words.

For each input photo, difficulty in finding vocabulary and communication flexibility are represented as P and R, respectively:

$$P(n) = \frac{|\{rel\_words\} \cap \{G_n\}|}{n}$$

$$R(n) = \frac{|\{rel\_words\} \cap \{G_n\}|}{|\{rel\_words\}|}$$

where n is the number of words displayed to the user, rel_words are the words in the groundtruth sentences, and $G_n$ are the top n words in the generated vocabulary rank. $F_1$, a common information retrieval measure that captures the trade-off between P and R, was also calculated as follows:

$$F_1(n) = 2 \times \frac{P(n) \times R(n)}{P(n) + R(n)}$$

These metrics were calculated for all $n \in [1, 100]$ to construct P-R curves with arithmetic mean values of P, R, and $F_1$ across all input photographs under analysis, in experiments. Such analysis clearly demonstrates trade-offs between the difficulty of finding a word among options and communication flexibility. Depending on the embodiment, the number of displayed candidate words varies, and is in some embodiments, user-selectable for each user. As such, understanding of such trade-offs can be desirable.

Further, to obtain a single measure of system performance across this entire interval of n, considering all experimental input images, we approximate the area under the P-R curves by calculating the mean average precision:

$$mAP = \sum_{n=1}^{100} P(n)(R(n) - R(n-1))$$

Figure 4:
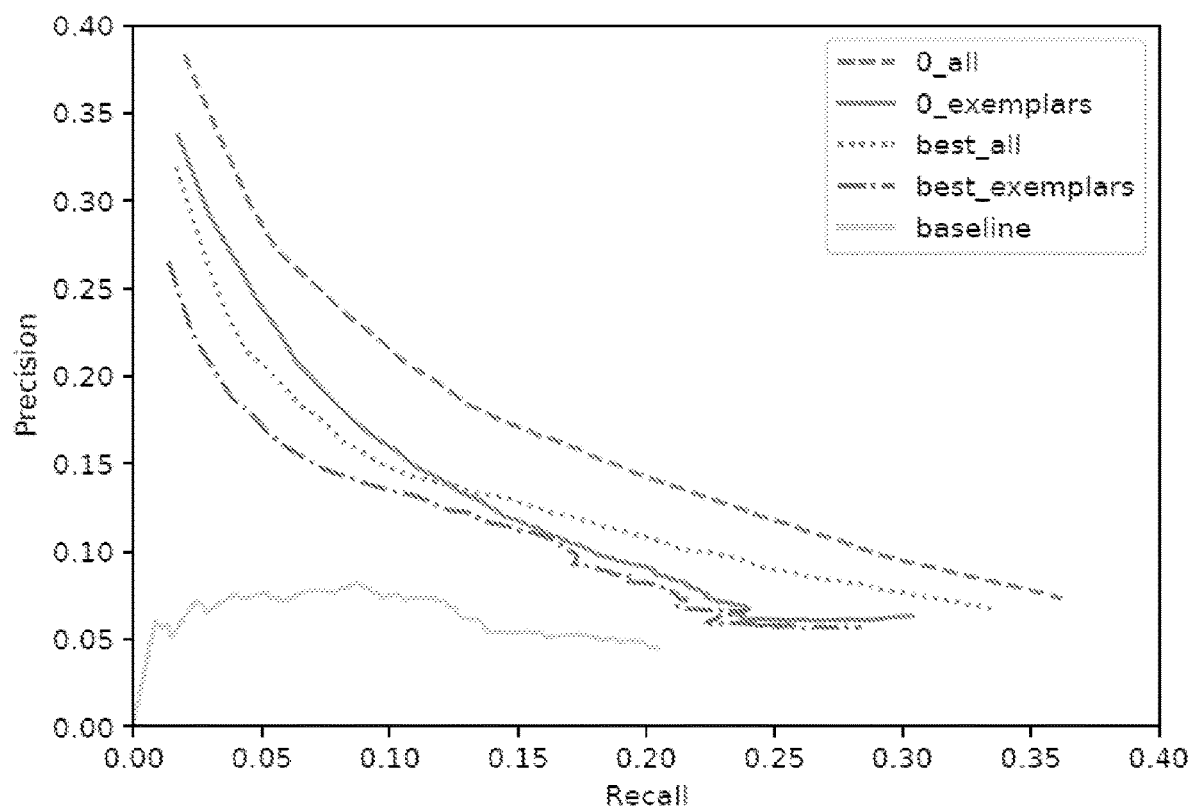
FIG. 4 shows P-R curves for configurations of an experimental system according to an embodiment of the invention.

FIG. 4 shows P-R curves of four configurations of the experimental system. Specifically, FIG. 4 shows P-R curves for configurations with different settings of system parameters Similarity Threshold and Selection Method. That is, 0_ALL used the Similarity Threshold parameter of 0 and the Selection Method of 'all descriptions'; 0_EXEMPLARS used the Similarity Threshold parameter of 0 and the Selection Method of 'cluster exemplars'; BEST_ALL used the Similarity Threshold parameter of BEST and the Selection Method of 'all descriptions'; and BEST_EXEMPLARS used the Similarity Threshold parameter of BEST and the Selection Method of 'cluster exemplars'. The Expansion Size was set to 0 in all configurations, for experimental simplicity. As well, a BASELINE set was created for comparison. As seen in FIG. 4, 0_ALL provided the best results in terms of overall mAP, with an mAP 4.6 times greater than the baseline mAP, and 1.8 greater than that of the worst configuration, BEST_EXEMPLARS. Details are shown in Table 1 below.

TABLE 1

| Configuration | mAP | mAP gain | max P | max R |
|---|---|---|---|---|
| 0_ALL | .058 | 4.61 | .38 | .36 |
| 0_EXEMP | .039 | 3.10 | .34 | .30 |
| BEST_ALL | .042 | 3.35 | .32 | .33 |
| BEST_EXEMP | .032 | 2.52 | .27 | .28 |
| BASELINE | .013 | 1.00 | .08 | .20 |

Context richness was also evaluated, as in [7]. As a first step, a person familiar with the experiment scored each image from 0-3 based on the number of contextual categories (environment, people/object, activity) that the image clearly depicts (when ambiguous, 0 was chosen). To validate these annotations, someone unfamiliar with the study also scored a subset of 514 photos (27.8% of the dataset). Krippendorff's well-known alpha reliability score was 0.82, indicating strong agreement between raters. The proportion of input images in the experimental set, according to their context richness score, was: 8% (0), 54% (1), 30% (2), and 8% (3). The well-known Mann-Whitney U test indicated a significant difference on P and R only between photos with context richness 0 and the remaining levels (p<0.002). Table 2 shows the mean performance metrics according to level of contextual information.

TABLE 2

| Context Level | mAP | mAP gain | max P | max R |
|---|---|---|---|---|
| 3 | .056 | 4.44 | .43 | .37 |
| 2 | .060 | 4.72 | .38 | .36 |
| 1 | .058 | 4.57 | .38 | .36 |
| 0 | .045 | 3.54 | .29 | .23 |
| BASELINE | .013 | 1.00 | .08 | .20 |

Figure 5:
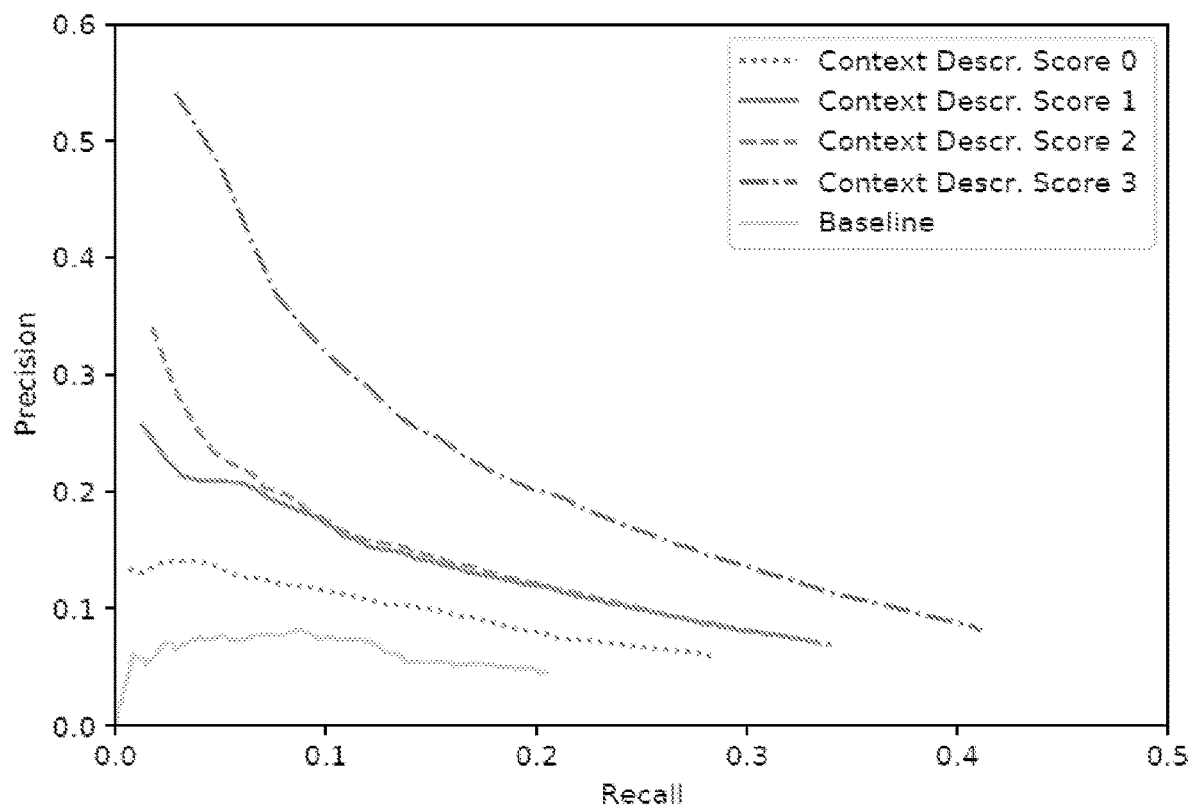
FIG. 5 shows P-R curves of the experimental system of FIG. 4 according to the quality of a generated description.

As well, the effects of context description were also evaluation. A person familiar with the experiment scored each image description from 0 to 3 as follows: (0) not generated or completely unrelated; (1) misses most important elements OR contains most of the important elements and a few unrelated elements; (2) contains most of the important elements OR contains all important elements and a few unrelated elements; (3) contains all important elements in the image AND does not contain any unrelated elements. Again, a subset was also scored by someone unfamiliar with the study, and the Krippendorff s alpha reliability score was 0.88, again confirming strong agreement. P-R curves according to the context description quality scores are shown in FIG. 5, and relevant parameters are given in Table 3. There were no significant differences between quality 1 and quality 2 images (p>0.2). However, images with description quality 3 significantly outperformed the other groups (p<0.001), and quality 0 photos performed significantly worse than all other groups other than the baseline set (p<0.001).

TABLE 3

| Descr. Quality | mAP | mAP gain | max P | max R |
|---|---|---|---|---|
| 3 | .086 | 6.86 | .54 | .41 |
| 2 | .048 | 3.77 | .34 | .34 |
| 1 | .045 | 3.57 | .26 | .33 |
| 0 | .028 | 2.21 | .14 | .29 |
| BASELINE | .013 | 1.00 | .08 | .20 |

Figure 6A:
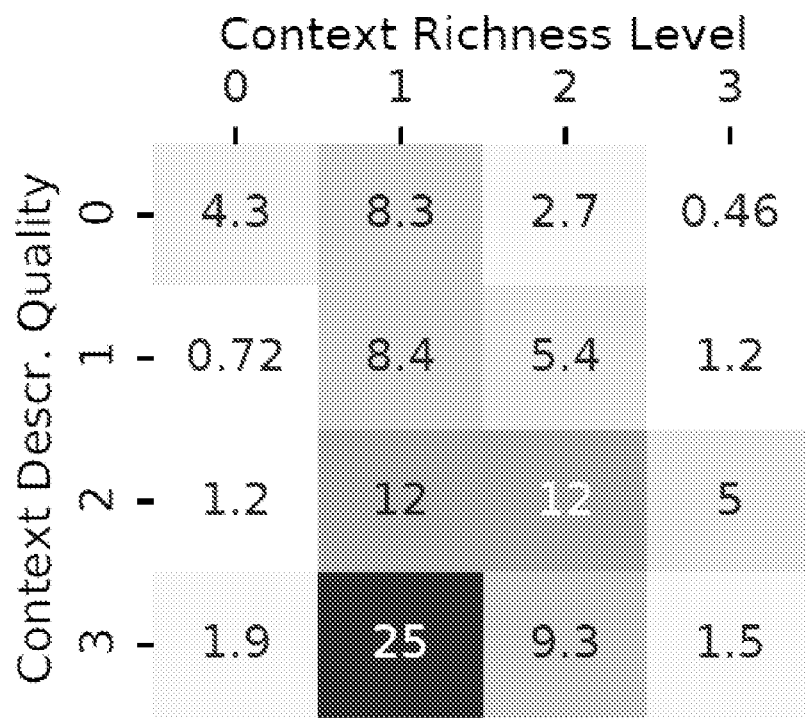
FIGS. 6A and 6B illustrate relationships between the level of contextual information in experimental input images and generated description quality.
Figure 6B:
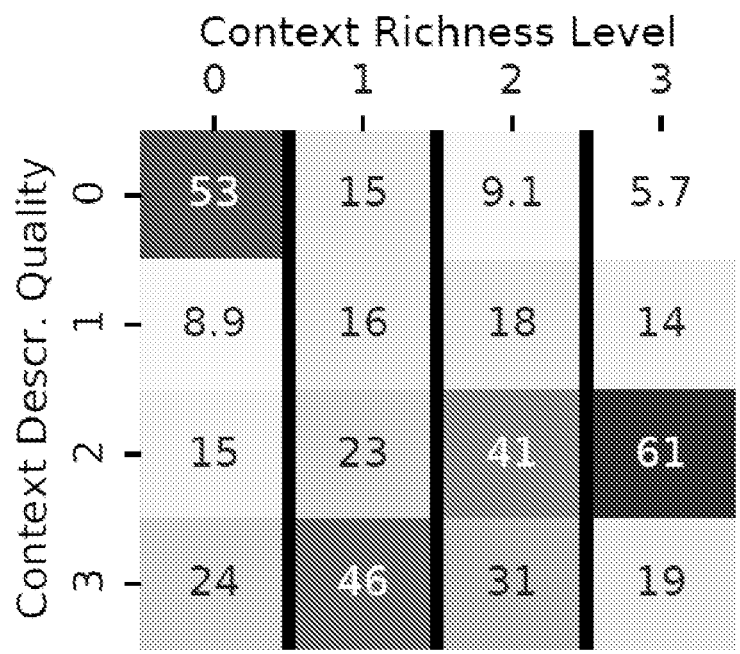

FIGS. 6A and 6B illustrate the relationship between the level of contextual information in the input images and the quality of the descriptions generated by the description-generation module using machine-learning. In particular, FIG. 6A illustrates the relationship as percentages relative to all images in the experimental set (i.e., 1,946 images). FIG. 6B illustrates the relationship as percentages relative to other images that share the same context richness level.

As expected, photos with ambiguous contextual information (level=0) most often received bad captions (53%). As context richness increased, the relative proportion of photos with good descriptions (scores 2 or 3) also increased (39%, 69%, 72%, 80%). However, the relative proportion of perfect descriptions (quality=3) decreased with context richness (46%, 31%, 19%). Images depicting only one type of contextual information (location, person/object, activity) resulted in the best descriptions: 46% received perfect descriptions, and 66% of all perfect descriptions were given to such images. However, when compared to images with more contextual information, they presented the highest relative proportion of very bad captions (15% vs 9.1% and 5.7%).

Figure 7:
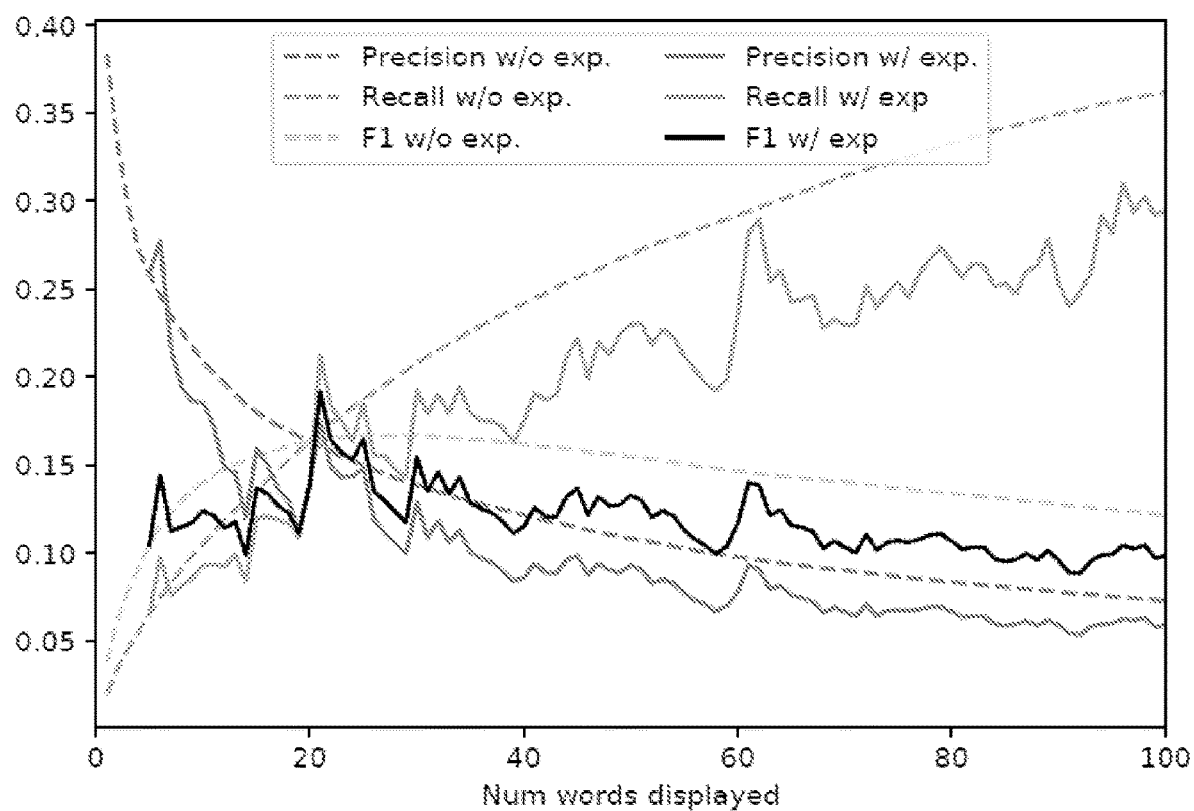
FIGS. 7 and 8 show the performance of the experimental system for different sizes of vocabulary pool.
Figure 8:
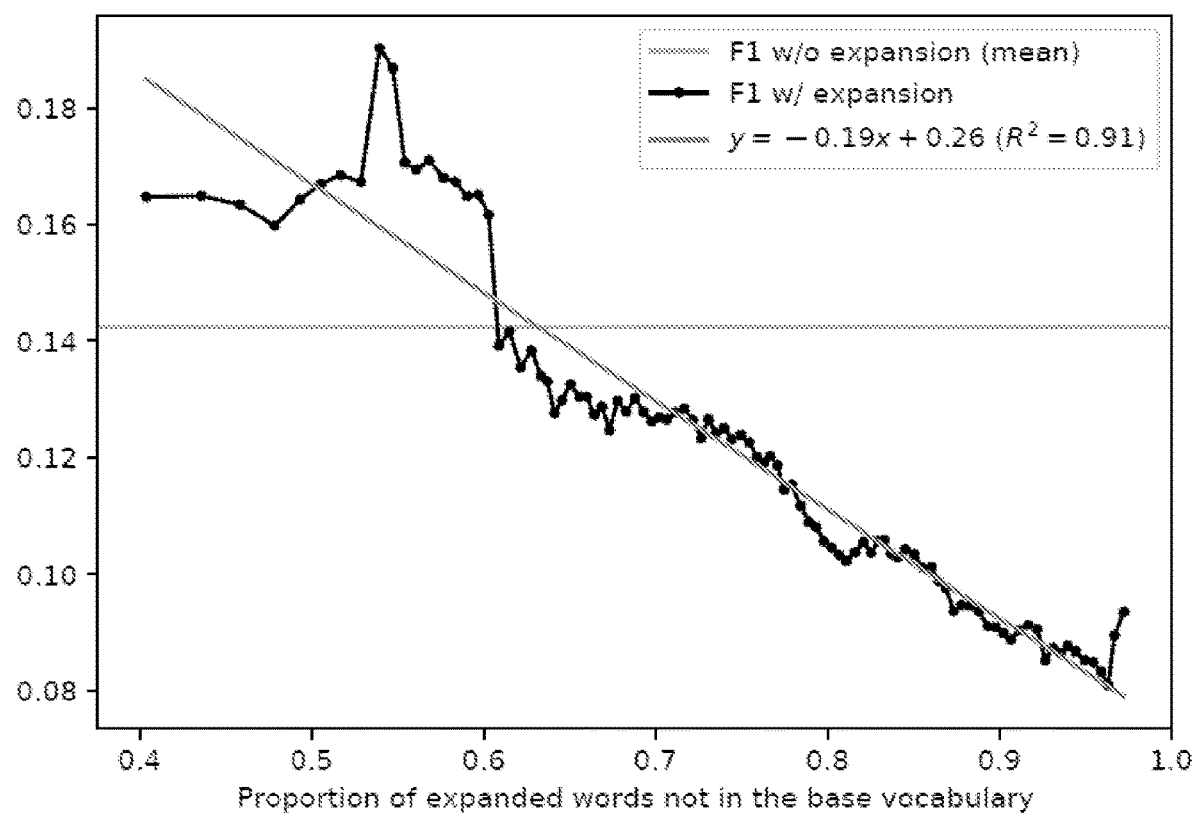

The effects of vocabulary expansion were also assessed. Specifically, 24 pairs of configurations were created for the experiment, by combining different base vocabulary/pool of frequent words sizes (5, 10, 15, 20, 25, 30) with expansion sizes (0, 1, 2, 3). The configuration [5-2], for example, contains five base words plus two expanded words per base word, resulting in a maximum of 15 words (or fewer, if the retrieved associated words were already in the pool of frequent words). FIG. 7 shows the performance of different combinations of base vocabulary and expansion sizes against base vocabulary only, in function of the number of words displayed n. In general, for a given n, generation without expansion resulted in superior performance. However, on configurations where a high proportion of retrieved words were already in the pool (e.g., n=6, 21, 61), expansion presented similar or even better $F_1$ scores than the base vocabulary on its own. The $F_1$ score, averaged across all images, as a function of the proportion of retrieved words not present in the pool of frequent words during generation is shown in FIG. 8. The mean $F_1$ for generation without word expansion is also plotted for comparison.

As shown, word expansion improves performance when less than 60% of the retrieved words are included in the final generated candidate vocabulary words (i.e., when more than 40% of retrieved words are already in the pool). The tendency is that, the lower the proportion of retrieved words not in the pool, the higher the performance.

Figure 9A:
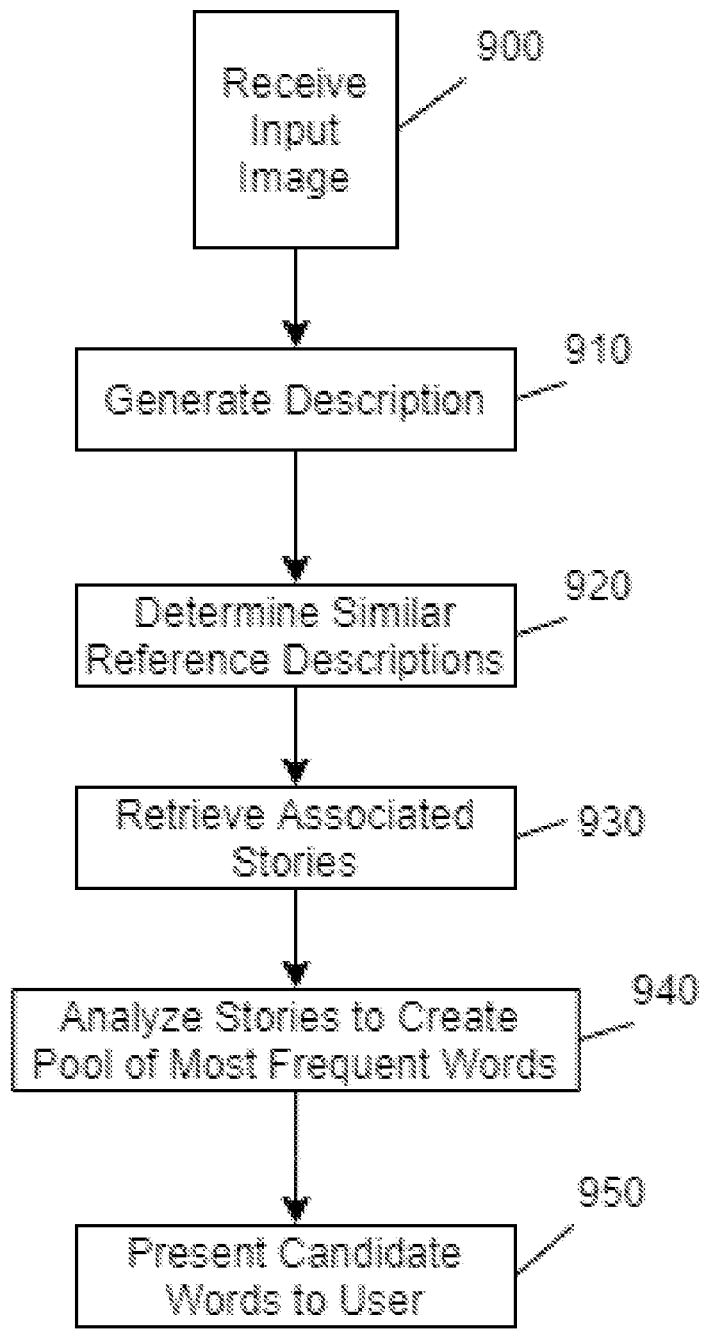
FIG. 9A is a flowchart detailing a method according to an aspect of the invention.

FIG. 9A is a flowchart detailing a method according to one aspect of the invention. At step 900, an input image is received. A description for the image is generated at step 910. Similar reference descriptions (from a reference database) are determined at step 920, to thereby determine relevant images. At step 930, stories associated with the relevant images are retrieved. At step 940, the retrieved stories are analyzed as described above, to create a pool of frequent words. The words in the pool of frequent words are then presented to the user as the candidate words at step 950.

Figure 9B:
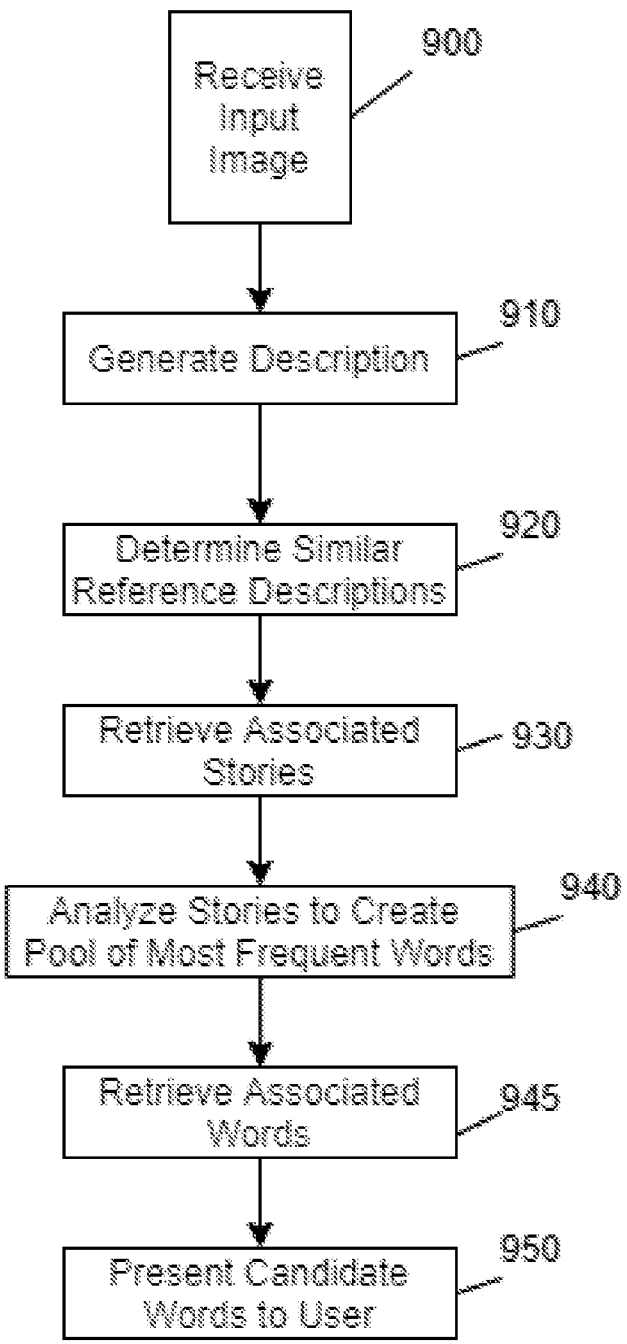
FIG. 9B is a flowchart detailing a method according to another embodiment of the invention.

FIG. 9B is another flowchart, detailing another embodiment of the method in FIG. 9A. Specifically, in the embodiment of FIG. 9B, associated words—i.e., words associated with terms in the pool of frequent words are retrieved from a vocabulary database at step 945. The associated words and the words in the pool of frequent words are then presented to the user as the candidate words at step 950.

As noted above, for a better understanding of the present invention, the following references may be consulted. Each of these references is hereby incorporated by reference in its entirety:

[1] Hao Fang, Saurabh Gupta, Forrest Iandola, Rupesh K Srivastava, Li Deng, Piotr Dollár, Jianfeng Gao, Xiaodong He, Margaret Mitchell, John C Platt, et al. 2015. From captions to visual concepts and back. In *Proceedings of the IEEE conference on computer vision and pattern recognition*, pages 1473-1482.

[2] Ting-Hao Huang, Francis Ferraro, Nasrin Mostafazadeh, Ishan Misra, Aishwarya Agrawal, Jacob Devlin, Ross Girshick, Xiaodong He, Pushmeet Kohli, Dhruv Batra, et al. 2016. Visual storytelling. In *Proceedings of the 2016 Conference of the North American Chapter of the Association for Computational Linguistics: Human Language Technologies*, pages 1233-1239.

[3] Grigori Sidorov, Alexander Gelbukh, Helena Gómez-Adorno, and David Pinto. 2014. Soft similarity and soft cosine measure: Similarity of features in vector space model. *Computación y Sistemas,* 18(3):491-504.

[4] Delphine Charlet and Geraldine Damnati. 2017. Simbow at semeval-2017 task 3: Soft-cosine semantic similarity between questions for community question answering. In *Proceedings of the 11th International Workshop on Semantic Evaluation (SemEval-2017)*, pages 315-319.

[5] Brendan J Frey and Delbert Dueck. 2007. Clustering by passing messages between data points. *Science,* 315(5814):972-976.

[6] Simon De Deyne, Danielle J Navarro, Amy Perfors, Marc Brysbaert, and Gert Storms. 2019. The "small world of words": English word association norms for over 12,000 cue words. *Behavior research methods,* 51(3):987-1006.

[7] David R Beukelman, Karen Hux, Aimee Dietz, Miechelle McKelvey, and Kristy Weissling. 2015. Using visual scene displays as communication sup-port options for people with chronic, severe aphasia: A summary of AAC research and future research directions. *Augmentative and Alternative Communication,* 31(3):234-245.

[8] Mauricio Fontana de Vargas and Karyn Moffat. 2021. Automated generation of storytelling vocabulary from photographs for use in AAC. In *Proceedings of the 59th Annual Meeting of the Association for Computational Linguistics and the 11th International Joint Conference on Natural Language Processing*, pages 1353-1364.

It should be clear that the various aspects of the present invention may be implemented as software modules in an overall software system. As such, the present invention may thus take the form of computer executable instructions that, when executed, implements various software modules with predefined functions.

Additionally, it should be clear that, unless otherwise specified, any references herein to 'image' or to 'images' refer to a digital image or to digital images, comprising pixels or picture cells. Likewise, any references to an 'audio file' or to 'audio files' refer to digital audio files, unless otherwise specified. 'Video', 'video files', 'data objects', 'data files' and all other such terms should be taken to mean digital files and/or data objects, unless otherwise specified.

Embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C #"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems.

Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above, all of which are intended to fall within the scope of the invention as defined in the claims that follow.

We claim:

1. A method for providing candidate words to a user, the method comprising:
   receiving an input image from a computing device used by said user;
   generating, at a server, a description for said input image;
   comparing said description to reference descriptions in a reference database, wherein:
      each of said reference descriptions is associated with a reference image in said reference database,
      said comparing produces a plurality of similarity scores between said reference descriptions and said description, wherein a specific one of said similarity scores is an indication of a semantic similarity between a specific one of said reference descriptions and said description, and
      when said specific one of said similarity scores is above a predetermined similarity threshold, a specific reference image corresponding to said specific one of said reference descriptions is determined to be a relevant image, to thereby result in a plurality of relevant images;
   retrieving, for each relevant image from said plurality of relevant images, at least one story associated with said relevant image, to thereby retrieve a plurality of stories;
   analyzing said plurality of stories to determine frequency scores for a plurality of words derived from said plurality of stories, wherein each of said frequency scores is an indication of a frequency of appearance of each of said plurality of words;
   when said frequency score for a specific word in said plurality of words is above a predetermined frequency threshold, adding said specific word to a pool of frequent words, such that words in said pool of frequent words comprise said candidate words; and
   providing said candidate words to said computing device for presentation to said user.

2. The method according to claim 1, further comprising retrieving associated vocabulary words from a vocabulary database before providing said candidate words to said user,
   wherein said vocabulary database also contains words in said pool of frequent words,
   wherein each of said associated vocabulary words is linked, in said database, to at least one of said words in said pool of frequent words,
   wherein each pair of words in said vocabulary database is linked together based on semantic relatedness between said pair of words, said semantic relatedness being based on at least one of: a similarity of meaning of said pair of words; a frequency of co-occurrence in written text of said pair of words; and responses of human participants in word-association experiments, and
   wherein said candidate words comprise said words in said pool of frequent words and said associated vocabulary words.

3. The method according to claim 1, wherein said description of said input image is generated using machine learning.

4. The method according to claim 1, wherein said analyzing said plurality of stories further comprises
   clustering said plurality of stories to thereby create a plurality of clusters, such that all stories in each cluster are semantically similar and wherein each cluster has an exemplar, said exemplar being a story that represents the cluster, such that a plurality of exemplars is generated,
   and wherein said frequency scores are only determined for words derived from said plurality of exemplars.

5. The method according to claim 1, wherein a number of candidate vocabulary words is limited by said user.

6. The method according to claim 1, wherein said similarity score is a numerical value between zero and one.

7. The method according to claim 1, wherein said frequency score is a numerical value between zero and one.

8. A system for providing candidate words to a user, the system comprising:
  a reference database containing reference descriptions and stories, wherein each of said reference descriptions and each of said stories is associated with a reference image; and
  a server for receiving an input image submitted by said user using a computing device, the server further comprising:
    a description-generation module for automatically generating a description for said input image;
    a similarity-analysis module for automatically comparing said description to reference descriptions in said reference database to thereby generate a plurality of similarity scores between said reference descriptions and said description, wherein a specific one of said similarity scores is an indication of a semantic similarity between a specific one of said reference descriptions and said description, such that, when a specific one of said similarity scores is above a predetermined similarity threshold, a specific reference image corresponding to said specific one of said reference descriptions is determined to be a relevant image; and
    a frequency-analysis module for analyzing a plurality of stories to determine frequency scores for a plurality of words derived from said plurality of stories, wherein, when said frequency score of a specific one of said plurality of words is above a predetermined frequency threshold, said specific word is added to a pool of frequent words; and
  wherein each of said plurality of stories is associated with a relevant image,
  wherein said words in said pool of frequent words comprise said candidate words, and
  wherein said server provides said candidate words to said computing device for presentation to said user.

9. The system according to claim 8, further comprising:
  a vocabulary database containing a plurality of words, wherein each of said plurality of words is linked to at least one other of said plurality of words and wherein said plurality of words comprises words in said pool of frequent words; and
  a vocabulary expansion module for receiving said pool of frequent words from said frequency-analysis module and for retrieving associated words from said vocabulary database, said associated words being linked to words in said pool of frequent words, wherein said frequent words and said associated words together comprise said candidate words.

10. The system according to claim 8, wherein said description-generation module generates said description of said input image using machine learning.

11. The system according to claim 8, wherein, before determining said frequency scores, said frequency-analysis module clusters said plurality of stories to thereby create a plurality of clusters, such that all stories in each cluster are semantically similar and wherein each cluster has an exemplar, said exemplar being a story that represents the cluster, such that a plurality of exemplars is generated, and wherein said frequency scores are only determined for words derived from said plurality of exemplars.

12. The system according to claim 8, wherein a number of candidate vocabulary words is limited by said user.

13. The system according to claim 8, wherein each pair of words in said vocabulary database are linked together based on at least one of: a similarity of meaning of said pair of words; a frequency of co-occurrence in written text of said pair of words; and responses of human participants in word-association experiments.

14. The system according to claim 8, wherein said similarity score is a numerical value between zero and one.

15. The system according to claim 8, wherein said frequency score is a numerical value between zero and one.

16. Non-transitory computer-readable media having encoded thereon computer-readable and computer-executable instructions, that, when executed, implement a method for providing candidate words to a user, the method comprising:
  receiving an input image from a computing device used by said user;
  generating, at a server, a description for said input image;
  comparing said description to reference descriptions in a reference database, wherein:
    each of said reference descriptions is associated with a reference image in said reference database,
    said comparing produces a plurality of similarity scores between said reference descriptions and said description, wherein a specific one of said similarity scores is an indication of a semantic similarity between a specific one of said reference descriptions and said description, and
    when said specific one of said similarity scores is above a predetermined similarity threshold, a specific reference image corresponding to said specific one of said reference descriptions is determined to be a relevant image, to thereby result in a plurality of relevant images;
  retrieving, for each relevant image from said plurality of relevant images, at least one story associated with said relevant image, to thereby retrieve a plurality of stories;
  analyzing said plurality of stories to determine frequency scores for a plurality of words derived from said plurality of stories, wherein each of said frequency scores is an indication of a frequency of appearance of each of said plurality of words;
  when said frequency score for a specific word in said plurality of words is above a predetermined frequency threshold, adding said specific word to a pool of frequent words, such that words in said pool of frequent words comprise said candidate words; and
  providing said candidate words to said computing device for presentation to said user.

17. The computer-readable media according to claim 16, said method further comprising retrieving associated vocabulary words from a vocabulary database before providing said candidate words to said user,
  wherein said vocabulary database also contains words in said pool of frequent words,
  wherein each of said associated vocabulary words is linked, in said database, to at least one of said words in said pool of frequent words,
  wherein each pair of words in said vocabulary database is linked together based on semantic relatedness between said pair of words, said semantic relatedness being based on at least one of: a similarity of meaning of said pair of words; a frequency of co-occurrence in written text of said pair of words; and responses of human participants in word-association experiments, and wherein said candidate words comprise said words in said pool of frequent words and said associated vocabulary words.

\* \* \* \* \*